(12) United States Patent
Iyoshi et al.

(10) Patent No.: US 12,359,855 B2
(45) Date of Patent: Jul. 15, 2025

(54) REFRIGERANT RECOVERY CONTROL DEVICE AND REFRIGERANT RECOVERY CONTROL SYSTEM

(71) Applicant: DAIKIN INDUSTRIES, LTD., Osaka (JP)

(72) Inventors: Yuuta Iyoshi, Osaka (JP); Yoshiki Yamanoi, Osaka (JP); Kumiko Saeki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 247 days.

(21) Appl. No.: 17/887,855

(22) Filed: Aug. 15, 2022

(65) Prior Publication Data

US 2022/0390158 A1 Dec. 8, 2022

Related U.S. Application Data

(63) Continuation of application No. PCT/JP2021/010723, filed on Mar. 17, 2021.

(30) Foreign Application Priority Data

Apr. 27, 2020 (JP) ................................ 2020-078297

(51) Int. Cl.
*F25B 45/00* (2006.01)
*F25B 41/20* (2021.01)
*F25B 49/02* (2006.01)

(52) U.S. Cl.
CPC .............. *F25B 45/00* (2013.01); *F25B 41/20* (2021.01); *F25B 49/02* (2013.01);
(Continued)

(58) Field of Classification Search
CPC .......... F25B 45/00; F25B 41/20; F25B 49/02; F25B 2345/003; F25B 2600/2515; F25B 2700/1931; F25B 2700/1933
See application file for complete search history.

(56) References Cited

U.S. PATENT DOCUMENTS

2010/0107665 A1    5/2010   Kawano et al.
2012/0073311 A1*   3/2012   Jeong ...................... F25B 45/00
                                                         62/149
(Continued)

FOREIGN PATENT DOCUMENTS

CN    107990501 A      5/2018
EP    3273183 A1 *    1/2018
(Continued)

OTHER PUBLICATIONS

English translation of Takigama et al. (EP-3273183-A1). (Year: 2018).*
(Continued)

*Primary Examiner* — Miguel A Diaz
(74) *Attorney, Agent, or Firm* — Birch, Stewart, Kolasch & Birch, LLP

(57) ABSTRACT

An outdoor unit 3 of an air conditioner 1 includes an outdoor control unit 31 having a first control mode and a second control mode different from each other as control modes of a refrigerant recovery operation for recovering a refrigerant of a refrigerant circuit 9. A flow rate of the refrigerant in the refrigerant circuit 9 in the first control mode is larger than a flow rate of the refrigerant in the refrigerant circuit 9 in the second control mode.

10 Claims, 4 Drawing Sheets

(52) U.S. Cl.
CPC . *F25B 2345/003* (2013.01); *F25B 2600/2515* (2013.01); *F25B 2700/1931* (2013.01); *F25B 2700/1933* (2013.01)

(56) References Cited

U.S. PATENT DOCUMENTS

| | | | | |
|---|---|---|---|---|
| 2013/0061614 | A1* | 3/2013 | Jeong | F25B 45/00 62/149 |
| 2014/0102665 | A1* | 4/2014 | Sibik | F25B 39/00 165/200 |
| 2020/0208889 | A1* | 7/2020 | Domyo | F25B 45/00 |
| 2020/0248943 | A1 | 8/2020 | Nishio et al. | |

FOREIGN PATENT DOCUMENTS

| | | | |
|---|---|---|---|
| EP | 3 627 077 A1 | 3/2020 | |
| JP | 4-281168 A | 10/1992 | |
| JP | 11-30459 A | 2/1999 | |
| JP | 2000-199659 A | 7/2000 | |
| JP | 2000-304363 A | 11/2000 | |
| JP | 2008-185229 A | 8/2008 | |
| JP | 2014-119122 A | 6/2014 | |
| JP | 2015-87071 A | 5/2015 | |
| JP | 2019-143877 A | 8/2019 | |
| WO | WO-2019009117 A1 * | 1/2019 | ............. F25B 45/00 |
| WO | WO 2019/069423 A1 | 4/2019 | |

OTHER PUBLICATIONS

English translation of Domyo (WO 2019009117 A1) (Year: 2019).*
Extended European Search Report for European Application No. 21795540.0, dated Oct. 18, 2023.
International Search Report (PCT/ISA/210) issued in PCT/JP2021/010723, dated Apr. 27, 2021.
International Preliminary Report on Patentability and English translation of the Written Opinion of the International Searching Authority for International Application No. PCT/JP2021/010723, dated Oct. 27, 2022.

* cited by examiner

US 12,359,855 B2

REFRIGERANT RECOVERY CONTROL DEVICE AND REFRIGERANT RECOVERY CONTROL SYSTEM

CROSS REFERENCE TO RELATED APPLICATIONS

This application is a Continuation of PCT International Application No. PCT/JP2021/010723, filed on Mar. 17, 2021, which claims priority under 35 U.S.C. 119(a) to Patent Application No. 2020-078297, filed in Japan on Apr. 27, 2020, all of which are hereby expressly incorporated by reference into the present application.

TECHNICAL FIELD

The present disclosure relates to a refrigerant recovery control device and a refrigerant recovery control system.

BACKGROUND ART

In Patent Literature 1, various measures are taken to increase a refrigerant recovery speed during a refrigerant recovery operation for recovering a refrigerant in an air conditioner. Specifically, an indoor fan and an outdoor fan are driven in a state where all valves of a refrigerant circuit are fully opened, and a temperature of a compressor is increased by energizing a crankcase heater or heating a motor.

CITATION LIST

Patent Literature

PATENT LITERATURE 1: Japanese Laid-Open Patent Publication No. 11-30459

SUMMARY a control unit having a first control mode and a second control mode different from each other as control modes of a refrigerant recovery operation for recovering a refrigerant in a refrigerant circuit in a refrigeration apparatus, in which the refrigerant in the refrigerant circuit in the first control mode has a flow rate that is larger than a flow rate of the refrigerant in the refrigerant circuit in the second control mode.

DETAILED DESCRIPTION

Hereinafter, an embodiment of the present invention will be described with reference to the drawings.

Figure 1:
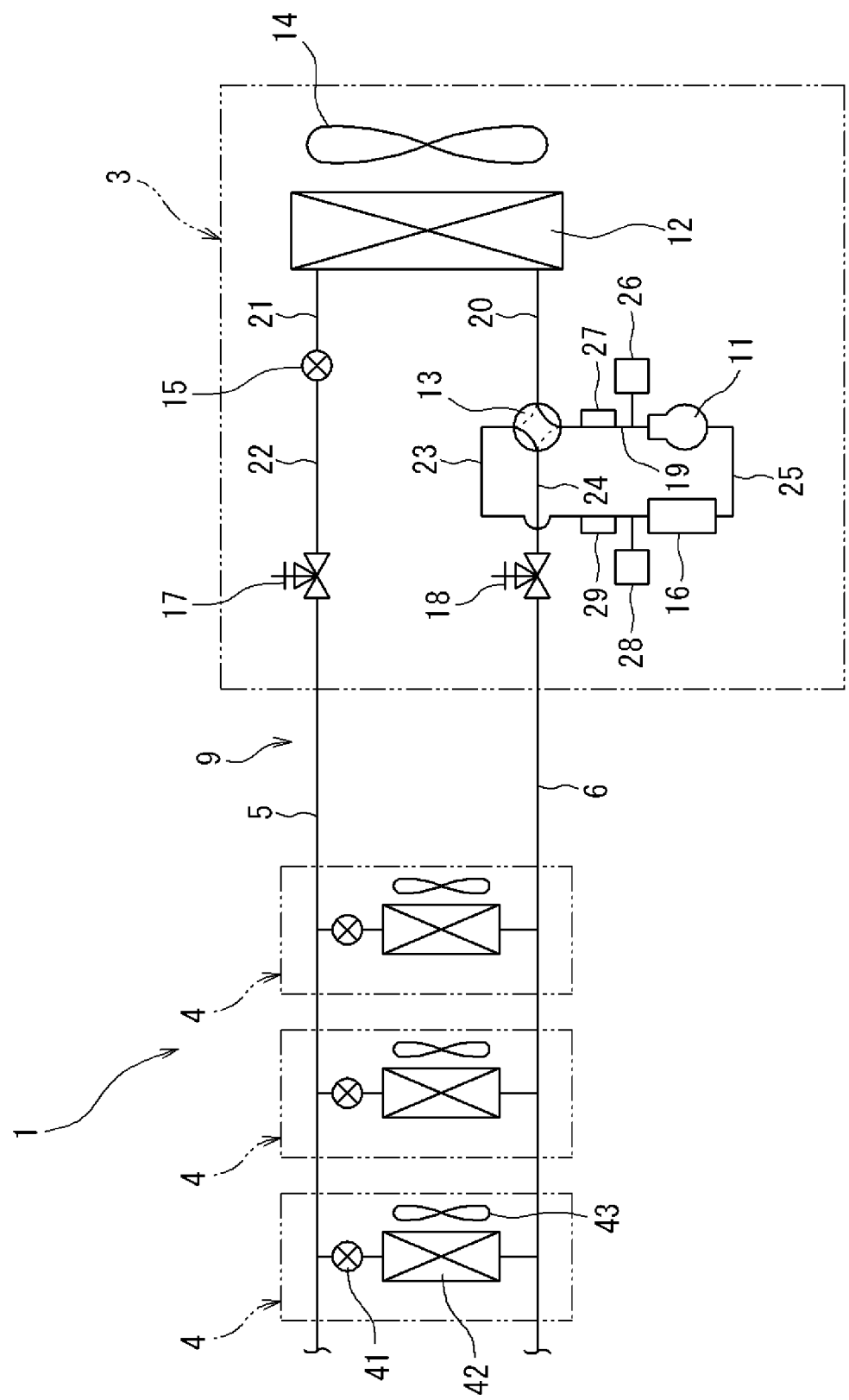
FIG. 1 is a schematic configuration diagram of an air conditioner according to an embodiment.

FIG. 1 is a schematic configuration diagram of an air conditioner according to the embodiment. An air conditioner 1 as a refrigeration apparatus is an apparatus that cools and heats the inside of a room in a large building by a vapor compression refrigeration cycle. The air conditioner 1 includes an outdoor unit 3, a plurality of (here, four) indoor units 4 connected in parallel to each other, a liquid-refrigerant connection pipe 5, and a gas-refrigerant connection pipe 6. The air conditioner 1 may include an intermediate unit that switches a flow of a refrigerant between the outdoor unit 3 and the plurality of indoor units 4. In this case, the intermediate unit may be installed outside the building, or may be installed in a machine chamber or the like of the building.

The outdoor unit 3 and the indoor units 4 are connected via the liquid-refrigerant connection pipe 5 and the gas-refrigerant connection pipe 6. This configures a vapor compression refrigerant circuit 9 of the air conditioner 1. The refrigerant circuit 9 is filled with a refrigerant such as R32, $CO_2$, or HFO.

[Outdoor Unit]

The outdoor unit 3 is installed outside of the building and constitutes part of the refrigerant circuit 9. The outdoor unit 3 includes a compressor 11, an outdoor heat exchanger 12, a four-way switching valve 13, an outdoor fan 14, an outdoor expansion valve 15, an accumulator 16, a liquid-side shutoff valve 17, and a gas-side shutoff valve 18. The devices 11 to 16 and the valves 17 and 18 are connected by refrigerant pipes 19 to 25.

The compressor 11 can change the number of operating rotations of a built-in motor (not shown) (a rotational speed of the compressor 11) by inverter control of the motor. The outdoor heat exchanger 12 is, for example, a cross fin tube type heat exchanger, and is used for exchanging heat with the refrigerant by using air as a heat source.

The outdoor fan 14 includes a motor (not shown) whose number of operating rotations is adjustable by inverter control. The outdoor fan 14 is configured to take in outdoor air into the outdoor unit 3, exchange heat between the taken-in air and the outdoor heat exchanger 12, and then blow the air out of the outdoor unit 3.

The four-way switching valve 13 reverses a flow of the refrigerant in the refrigerant circuit 9, and supplies the refrigerant discharged from the compressor 11 by switching between the outdoor heat exchanger 12 and the indoor heat exchanger 42 (described later). The accumulator 16 temporarily stores the refrigerant sucked into the compressor 11. The liquid-side shutoff valve 17 and the gas-side shutoff valve 18 are electric valves whose opening degrees are manually adjustable. The operations of the compressor 11, the four-way switching valve 13, the outdoor fan 14, the outdoor expansion valve 15, the liquid-side shutoff valve 17, and the gas-side shutoff valve 18 are controlled by an outdoor control unit 31 (described later).

The outdoor unit 3 further includes a discharge pressure sensor 26, a discharge temperature sensor 27, a suction pressure sensor 28, and a suction temperature sensor 29.

The discharge pressure sensor 26 detects a pressure of the refrigerant discharged from the compressor 11. The discharge temperature sensor 27 detects a temperature of the refrigerant discharged from the compressor 11. The suction pressure sensor 28 detects a pressure of the refrigerant sucked into the compressor 11. The suction temperature sensor 29 detects a temperature of the refrigerant sucked into the compressor 11.

Figure 2:
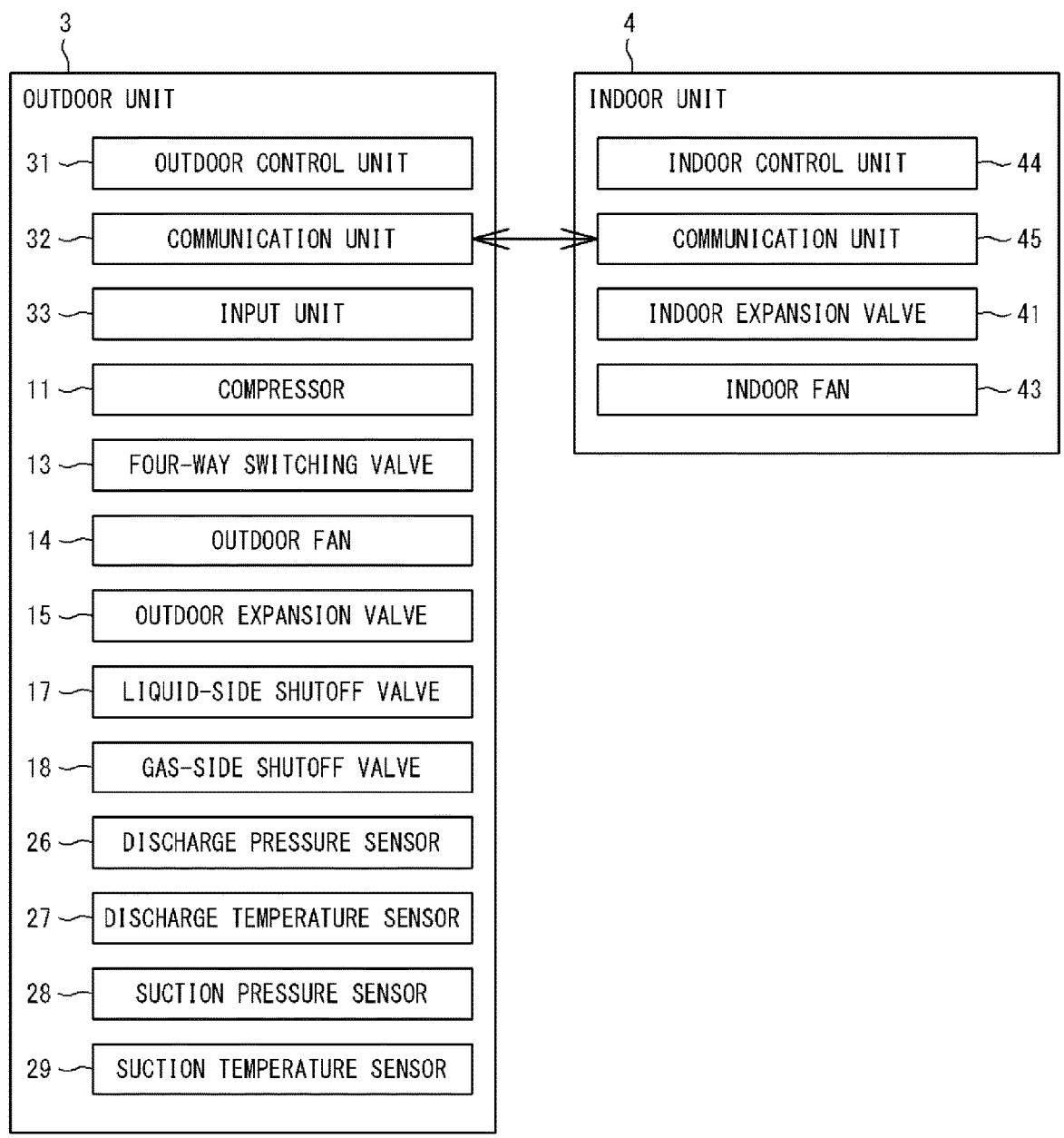
FIG. 2 is a block diagram illustrating an example of internal configurations of an outdoor unit and an indoor unit.

Signals detected by the sensors 26 to 29 are input to the outdoor control unit 31 (see FIG. 2). The operations of the compressor 11, the outdoor fan 14, and the outdoor expansion valve 15 are controlled by the outdoor control unit 31 in accordance with output of the sensors 26 to 29.

[Indoor Unit]

The indoor units 4 are installed inside of the building and constitute part of the refrigerant circuit 9. Each of the indoor units 4 includes an indoor expansion valve 41, an indoor heat exchanger 42, and an indoor fan 43.

As the indoor expansion valve 41, an electric expansion valve capable of adjusting a refrigerant pressure and a flow rate of the refrigerant is used. The indoor heat exchanger 42 is, for example, a cross fin tube type heat exchanger, and is used for exchanging heat with indoor air.

The indoor fan 43 includes a motor (not shown) whose number of operating rotations is adjustable by inverter control. The indoor fan 43 is configured to take indoor air into the indoor unit 4, exchange heat between the taken-in air and the indoor heat exchanger 42, and then blow the air into the room. The opening degree of the indoor expansion valve 41 and the driving of the indoor fan 43 are controlled by an indoor control unit 44 (described later) (see FIG. 2).

The liquid-refrigerant connection pipe 5 has one end that is connected to the liquid-side shutoff valve 17 of the outdoor unit 3 and the other end that is connected to a liquid side of the indoor expansion valves 41 of the indoor units 4. The gas-refrigerant connection pipe 6 has one end that is connected to the gas-side shutoff valve 18 of the outdoor unit 3 and the other end that is connected to a gas side of the indoor heat exchangers 42 of the indoor units 4.

[Internal Configurations of Outdoor Unit and Indoor Unit]

FIG. 2 is a block diagram illustrating an example of internal configurations of the outdoor unit 3 and the indoor unit 4.

The indoor unit 4 includes the indoor control unit 44 and a communication unit 45. The communication unit 45 includes a communication interface, and transmits and receives various information to and from the outdoor control unit 31. The indoor control unit 44 is a microcomputer including a CPU, a memory, and the like. The indoor control unit 44 controls the indoor expansion valve 41 and the indoor fan 43 on the basis of a command from the outdoor control unit 31.

The outdoor unit 3 includes the outdoor control unit 31, a communication unit 32, and an input unit 33.

The communication unit 32 includes a communication interface, and transmits and receives various information to and from the communication unit 45 of the indoor unit 4. The input unit 33 includes, for example, a dip switch or the like provided on a substrate, and performs an operation on the outdoor unit 3, setting of a control mode of a refrigerant recovery operation (described later), and the like.

The outdoor control unit 31 is a microcomputer including a CPU, a memory, and the like. The outdoor control unit 31 controls the operation of the air conditioner 1 as a whole by controlling various components of the outdoor unit 3 and the indoor unit 4 on the basis of detection signals and the like of the sensors as described above. The outdoor control unit 31 performs cooling operation control for controlling a cooling operation, heating operation control for controlling a heating operation, and refrigerant recovery operation control for controlling the refrigerant recovery operation. In the present embodiment, the outdoor control unit 31, the communication unit 32, and the input unit 33 constitute a refrigerant recovery control device that controls the refrigerant recovery operation of the air conditioner 1.

In the cooling operation control, the outdoor heat exchanger 12 acts as an evaporator, and the indoor heat exchanger 42 acts as a condenser. Specifically, the outdoor control unit 31 switches the four-way switching valve 13 to an outdoor heat radiation state (a state indicated by a solid line in FIG. 1), and opens the liquid-side shutoff valve 17 and the gas-side shutoff valve 18. The outdoor control unit 31 then drives the compressor 11 and the outdoor fan 14, and outputs a command to drive the indoor fan 43 to the indoor control unit 44.

A high-pressure refrigerant discharged from the compressor 11 flows out of the outdoor unit 3 through the four-way switching valve 13, the outdoor heat exchanger 12, the outdoor expansion valve 15, and the liquid-side shutoff valve 17. The refrigerant flowing out of the outdoor unit 3 is branched and sent to the plurality of indoor units 4 through the liquid-refrigerant connection pipe 5. Then, the refrigerant merges and is sent to the outdoor unit 3 through the indoor expansion valve 41, the indoor heat exchanger 42, and the gas-refrigerant connection pipe 6 of each indoor unit 4. Thereafter, the refrigerant is sucked into the compressor 11 through the gas-side shutoff valve 18, the four-way switching valve 13, and the accumulator 16.

In the heating operation control, the outdoor heat exchanger 12 acts as a condenser, and the indoor heat exchanger 42 acts as an evaporator. Specifically, the outdoor control unit 31 switches the four-way switching valve 13 to an outdoor heat evaporation state (a state indicated by a broken line in FIG. 1), and opens the liquid-side shutoff valve 17 and the gas-side shutoff valve 18. The outdoor control unit 31 then drives the compressor 11 and the outdoor fan 14, and outputs a command to drive the indoor fan 43 to the indoor control unit 44.

A high-pressure refrigerant discharged from the compressor 11 flows out of the outdoor unit 3 through the four-way switching valve 13 and the gas-side shutoff valve 18. The refrigerant flowing out of the outdoor unit 3 is branched and sent to the plurality of indoor units 4 through the gas-refrigerant connection pipe 6. Then, the refrigerant merges and is sent to the outdoor unit 3 through the indoor heat exchanger 42, the indoor expansion valve 41, and the liquid-refrigerant connection pipe 5 of each indoor unit 4. Thereafter, the refrigerant is sucked into the compressor 11 through the liquid-side shutoff valve 17, the outdoor expansion valve 15, the outdoor heat exchanger 12, the four-way switching valve 13, and the accumulator 16.

The refrigerant recovery operation is performed when the refrigerant in the refrigerant circuit 9 is recovered to the outdoor unit 3. At this time, the outdoor heat exchanger 12 and the accumulator 16 of the outdoor unit 3 function as a recovery unit that recovers the refrigerant in the refrigerant circuit 9. Hereinafter, the outdoor heat exchanger 12 and the accumulator 16 are also referred to as recovery units 12 and 16.

In the refrigerant recovery operation control, the outdoor control unit 31 switches the four-way switching valve 13 to the outdoor heat radiation state as in the cooling operation. The outdoor control unit 31 closes the liquid-side shutoff valve 17 and opens the gas-side shutoff valve 18, the outdoor expansion valve 15, and the indoor expansion valve 41. The outdoor control unit 31 then drives the compressor 11 and the outdoor fan 14, and outputs a command to drive the indoor fan 43 to the indoor control unit 44.

When the compressor 11 is driven, the refrigerant retained in a refrigerant pipe 22, the liquid-refrigerant connection pipe 5, the indoor expansion valve 41, the indoor heat exchanger 42, and the gas-refrigerant connection pipe 6 in the refrigerant circuit 9 flows into the accumulator 16 through the gas-side shutoff valve 18 and the four-way switching valve 13. Of the refrigerant flowing into the accumulator 16, a liquid refrigerant stays in the accumulator 16, and a gas refrigerant is sucked into the compressor 11 and flows from the compressor 11 into the outdoor heat exchanger 12 through the four-way switching valve 13. The gas refrigerant flowing into the outdoor heat exchanger 12 flows out toward the liquid-side shutoff valve 17, but since the liquid-side shutoff valve 17 is closed, the refrigerant accumulates in the outdoor heat exchanger 12. As described above, the refrigerant in the refrigerant circuit 9 is recovered by the recovery units 12 and 16 of the outdoor unit 3.

When the recovery of the refrigerant into the recovery units 12 and 16 is completed, the outdoor control unit 31 stops the driving of the compressor 11, the outdoor fan 14, and the indoor fan 43, and closes the gas-side shutoff valve 18. By closing the gas-side shutoff valve 18 in this manner, the refrigerant recovered by the recovery units 12 and 16 can be prevented from flowing out toward the indoor unit 4.

[Control Modes of Refrigerant Recovery Operation]

The outdoor control unit 31 has a first control mode and a second control mode different from each other as control modes of the refrigerant recovery operation. The first control mode and the second control mode are selected and set by the input unit 33 of the outdoor unit 3 by a service engineer or the like. The outdoor control unit 31 selectively executes the first control mode and the second control mode as the refrigerant recovery operation control on the basis of an output signal from the input unit 33.

The first control mode is used as a control mode of the refrigerant recovery operation, for example, when the refrigerant recovery operation is performed at a time of discarding the air conditioner 1. When the air conditioner 1 is discarded, the air conditioner 1 will not be used in future. Thus, there is no problem even if some damage is given to the air conditioner 1 as long as the air conditioner 1 can be operated until the refrigerant is completely recovered. Therefore, in the first control mode, the refrigerant recovery operation is performed by increasing the flow rate of the refrigerant in the refrigerant circuit 9 so as to prioritize reduction of refrigerant recovery time over damage to the air conditioner 1.

The second control mode is used as a control mode of the refrigerant recovery operation, for example, in a case where the air conditioner 1 is continuously used after the refrigerant recovery operation. As a case where the air conditioner 1 is continuously used after the refrigerant recovery operation, there may be a case where the air conditioner 1 is expanded, relocated, maintained, or updated. In these cases, since the air conditioner 1 is continuously used after the refrigerant is recovered, it is not preferable to damage the air conditioner 1. Therefore, in the second control mode, the refrigerant recovery operation is performed by reducing the flow rate of the refrigerant in the refrigerant circuit 9 so as to prioritize suppression of damage to the air conditioner 1 over reduction of the refrigerant recovery time.

As described above, the outdoor control unit 31 controls the components of the outdoor unit 3 and the indoor unit 4 such that the flow rate of the refrigerant in the refrigerant circuit 9 in the first control mode is larger than the flow rate of the refrigerant in the refrigerant circuit 9 in the second control mode. In the present embodiment, the outdoor control unit 31 controls the operation of the compressor 11 such that the rotational speed of the compressor 11 that compresses and discharges the refrigerant of the refrigerant circuit 9 in the first control mode is higher than the rotational speed of the compressor 11 in the second control mode.

For example, in the first control mode, the outdoor control unit 31 controls the operation of the compressor 11 such that a pressure of the refrigerant sucked from the compressor 11 (first pressure) approaches a predetermined protection lower limit value, or a pressure of the refrigerant discharged from the compressor 11 (second pressure) approaches a predetermined protection upper limit value. Here, the protection lower limit value is an allowable lower limit value of the first pressure against damage to the compressor 11. Here, the protection upper limit value is an allowable upper limit value of the second pressure against damage to the compressor 11.

In the second control mode, the outdoor control unit 31 controls the operation of the compressor 11 such that the first pressure does not become lower than or equal to a predetermined drooping lower limit value and the second pressure does not become higher than or equal to a predetermined drooping upper limit value. The drooping value is a value determined to protect the compressor 11 during a normal operation (during the cooling operation or the heating operation) of the air conditioner 1, and is a value of the first pressure and a value of the second pressure that define a range in which the refrigerant recovery operation can be performed so as not to greatly damage the compressor 11. The drooping lower limit value that is a lower limit value of the first pressure is a value larger than the protection lower limit value. The drooping upper limit value that is an upper limit value of the second pressure is a value smaller than the protection upper limit value.

When the first pressure of the compressor 11 is low or the second pressure of the compressor 11 is high, the refrigerant can be recovered by the recovery units 12 and 16 in a short time. However, when the first pressure of the compressor 11 is excessively low or the second pressure of the compressor 11 is excessively high, the temperature of the compressor 11 rises and the compressor 11 may be damaged. In the first control mode, the reduction of the refrigerant recovery time is prioritized over the damage to the compressor 11. Therefore, in the first control mode, the outdoor control unit 31 controls the operation of the compressor 11 on the basis of a detection value of the suction pressure sensor 28 or the discharge pressure sensor 26 such that the first pressure of the compressor 11 becomes a value close to the protection lower limit value (for example, 0.07 MPa) or the second pressure of the compressor 11 becomes a value close to the protection upper limit value (for example, 3.7 MPa).

On the other hand, in the second control mode, the suppression of the damage to the compressor 11 is prioritized over the reduction of the refrigerant recovery time. Therefore, in the second control mode, the outdoor control unit 31 controls the operation of the compressor 11 such that the first pressure of the compressor 11 becomes higher than or equal to the drooping lower limit value and the second pressure of the compressor 11 becomes lower than or equal to the drooping upper limit value.

Specifically, in the second control mode, the outdoor control unit 31 controls the operation of the compressor 11 on the basis of a detection value of the suction pressure sensor 28 or the discharge pressure sensor 26 such that the first pressure of the compressor 11 becomes greater than or equal to a value (for example, 0.25 MPa) higher than the protection lower limit value or the second pressure of the compressor 11 becomes less than or equal to a value (for example, 3.5 MPa) lower than the protection upper limit value.

In the first control mode, the outdoor control unit 31 controls the operation of the compressor 11 such that the temperature of the refrigerant discharged from the compressor 11 (discharge-side temperature) approaches a predetermined protection upper limit temperature. Here, the protection upper limit temperature is an upper limit value of the discharge-side temperature at which the compressor 11 can be driven without failure.

When the discharge-side temperature of the compressor 11 is high, the refrigerant can be recovered by the recovery units 12 and 16 in a short time. However, when the discharge-side temperature of the compressor 11 is excessively high, the compressor 11 may be damaged. In the first control mode, the reduction of the refrigerant recovery time is prioritized over the damage to the compressor 11. Therefore, in the first control mode, the outdoor control unit 31 controls the operation of the compressor 11 on the basis of a detection value of the discharge temperature sensor 27 such that the discharge-side temperature of the compressor 11 becomes a value close to the protection upper limit temperature (for example, 135° C.).

On the other hand, in the second control mode, the suppression of the damage to the compressor 11 is prioritized over the reduction of the refrigerant recovery time. Thus, in the second control mode, the outdoor control unit 31 controls the operation of the compressor 11 such that the discharge-side temperature of the compressor 11 does not approach the protection upper limit temperature. Specifically, in the second control mode, the outdoor control unit 31 controls the operation of the compressor 11 on the basis of a detection value of the discharge temperature sensor 27 such that the discharge-side temperature of the compressor 11 becomes less than or equal to a value lower than the protection upper limit temperature (for example, 110° C.).

[Control of Refrigerant Recovery Operation]

Figure 3:
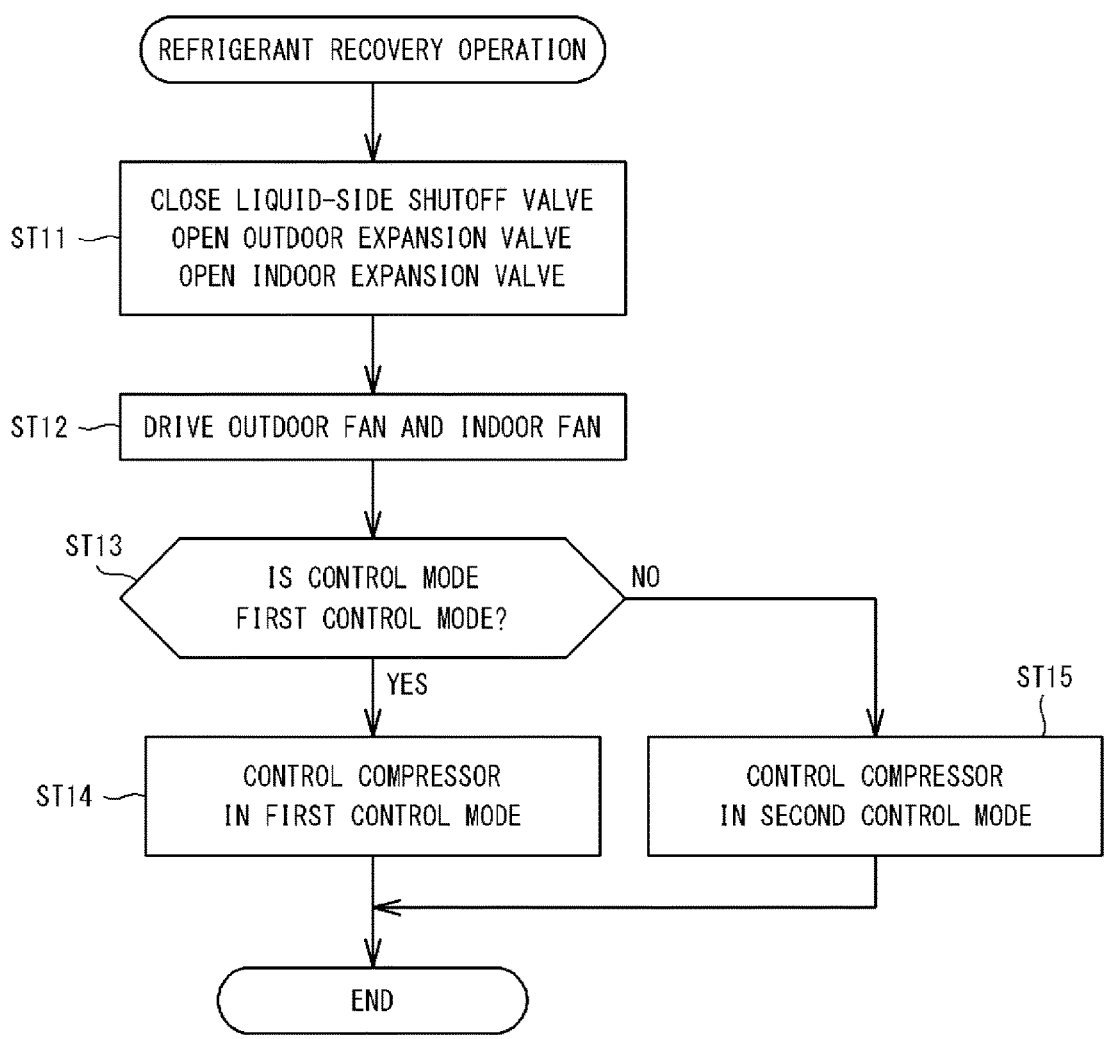
FIG. 3 is a flowchart illustrating a control example during a refrigerant recovery operation of the air conditioner.

FIG. 3 is a flowchart illustrating a control example during the refrigerant recovery operation of the air conditioner 1. Note that a specific pressure value and temperature value described below are merely examples, and it goes without saying that the specific pressure value and temperature value are different values depending on the type of the refrigerant.

First, the outdoor control unit 31 closes the liquid-side shutoff valve 17 and opens the outdoor expansion valve 15 and the indoor expansion valve 41 (step ST11). Thereafter, the outdoor control unit 31 drives the outdoor fan 14 and the indoor fan 43 (step ST12).

The outdoor control unit 31 determines whether the output signal from the input unit 33 is a signal indicating the first control mode (step ST13). When the output signal from the input unit 33 is a signal indicating the first control mode ("Yes" in step ST13), the outdoor control unit 31 controls the operation of the compressor 11 in the first control mode (step ST14).

Specifically, the outdoor control unit 31 controls the operation of the compressor 11 such that the rotational speed of the compressor 11 becomes high. For example, the outdoor control unit 31 controls the operation of the compressor 11 such that the first pressure of the compressor 11 becomes a value close to the protection lower limit value of 0.07 MPa or the second pressure of the compressor 11 becomes a value close to the protection upper limit value of 3.7 MPa. The outdoor control unit 31 controls the operation of the compressor 11 such that the discharge-side temperature of the compressor 11 becomes a value close to 135° C., which is the protection upper limit temperature.

When the output signal from the input unit 33 is not a signal indicating the first control mode ("No" in step ST13), the outdoor control unit 31 determines that the output signal from the input unit 33 is a signal indicating the second control mode and controls the operation of the compressor 11 in the second control mode (step ST15).

Specifically, the outdoor control unit 31 controls the operation of the compressor 11 such that the rotational speed of the compressor 11 becomes lower than the rotational speed of the compressor 11 in the first control mode. For example, the outdoor control unit 31 controls the operation of the compressor 11 such that the first pressure of the compressor 11 becomes greater than or equal to 0.25 MPa which is higher than the protection lower limit value and the second pressure of the compressor 11 becomes less than or equal to 3.5 MPa which is lower than the protection upper limit value. The outdoor control unit 31 controls the operation of the compressor 11 such that the discharge-side temperature of the compressor 11 becomes less than or equal to 110° C. which is lower than the protection upper limit temperature.

There are two timings for recovering a refrigerant of an air conditioner, that is, at a time of disposal of the air conditioner and at a time of service for adding or moving an indoor unit. However, in Patent Literature 1, the refrigerant recovery operation is performed by the same control method at any of the two timings.

An object of the present disclosure is to provide a refrigerant recovery control device and a refrigerant recovery control system capable of performing a refrigerant recovery operation according to a timing of recovering a refrigerant.

[Functional Effects of Embodiment]

In the air conditioner 1 according to the present embodiment, the outdoor control unit 31 can selectively use the first control mode and the second control mode in which the flow rate of the refrigerant in the refrigerant circuit 9 is different during the refrigerant recovery operation for recovering the refrigerant in the refrigerant circuit 9, and thus can perform the refrigerant recovery operation in accordance with a timing of recovering recover the refrigerant.

The outdoor control unit 31 controls the operation of the compressor 11 such that the rotational speed of the compressor 11 that compresses and discharges the refrigerant of the refrigerant circuit 9 in the first control mode is higher than the rotational speed of the compressor 11 in the second control mode. As a result, in the first control mode, the flow rate of the refrigerant in the refrigerant circuit 9 can be easily increased as compared with the second control mode.

When the refrigerant is recovered at the time of discarding the air conditioner 1, there is no problem even if some damage is given to the air conditioner 1. Thus, in the first control mode, the flow rate of the refrigerant in the refrigerant circuit 9 can be made larger than in the second control mode. As a result, refrigerant recovery time can be reduced. In a case where the air conditioner 1 is continuously used after the refrigerant is recovered, the flow rate of the refrigerant in the refrigerant circuit 9 can be made smaller in the second control mode during the refrigerant recovery than in the first control mode. As a result, the damage to the air conditioner 1 can be suppressed.

In the first control mode, the outdoor control unit 31 controls the compressor 11 such that the first pressure of the compressor 11 becomes a value close to the protection lower limit value or the second pressure of the compressor 11 becomes a value close to the protection upper limit value. Thus, the flow rate of the refrigerant in the refrigerant circuit 9 can be increased as much as possible. As a result, the refrigerant recovery time can be reduced as much as possible.

In the second control mode, the outdoor control unit 31 controls the compressor 11 such that the first pressure of the compressor 11 becomes higher than or equal to the drooping lower limit value and the second pressure of the compressor 11 becomes lower than or equal to the drooping upper limit value. Accordingly, the refrigerant can be recovered while suppressing the damage to the compressor 11.

[Modification]

Figure 4:
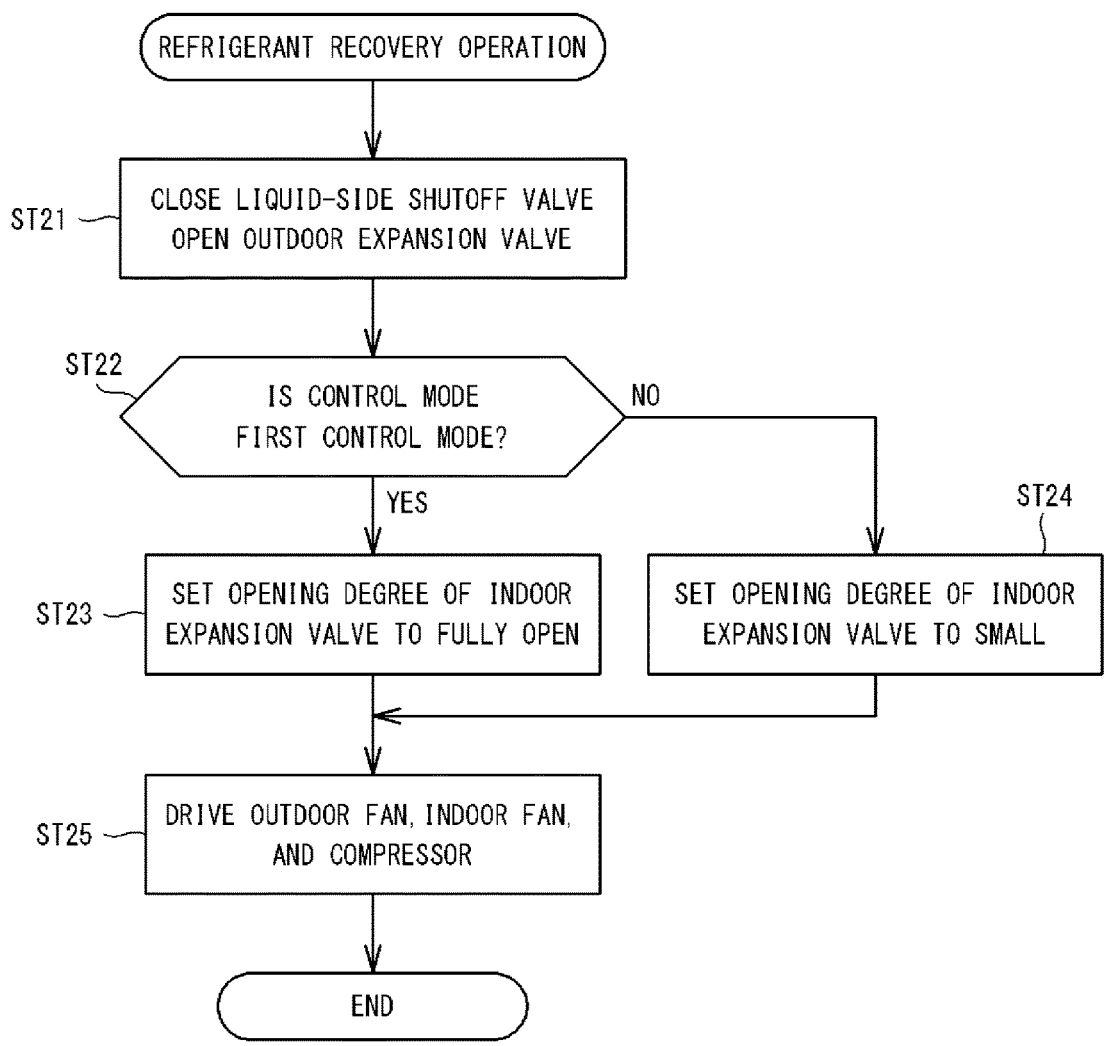
FIG. 4 is a flowchart illustrating a modification of the control example during the refrigerant recovery operation of the air conditioner.

FIG. 4 is a flowchart illustrating a modification of the control example during the refrigerant recovery operation of the air conditioner 1. The outdoor control unit 31 of the present modification controls the opening degree of the indoor expansion valve 41 such that the opening degree of the indoor expansion valve 41 that is adjustable of the flow of the refrigerant in the refrigerant circuit 9 in the first control mode is larger than the opening degree of the indoor expansion valve 41 in the second control mode.

For example, the outdoor control unit 31 controls the opening degree of the indoor expansion valve 41 such that the opening degree of the indoor expansion valve 41 is fully opened in the first control mode. The outdoor control unit 31 controls the opening degree of the indoor expansion valve 41 such that the opening degree of the indoor expansion valve 41 in the second control mode is smaller than when the indoor expansion valve 41 is fully opened. Details of the control will be described below.

First, the outdoor control unit 31 closes the liquid-side shutoff valve 17 and opens the outdoor expansion valve 15 (step ST21). Next, the outdoor control unit 31 determines whether the output signal from the input unit 33 is a signal indicating the first control mode (step ST22). When the output signal from the input unit 33 is a signal indicating the first control mode ("Yes" in step ST22), the outdoor control unit 31 controls the opening degree of the indoor expansion valve 41 in the first control mode (step ST23). Specifically, the outdoor control unit 31 controls the opening degree of the indoor expansion valve 41 such that the indoor expansion valve 41 is fully opened.

When the output signal from the input unit 33 is not a signal indicating the first control mode ("No" in step ST22), the outdoor control unit 31 determines that the output signal from the input unit 33 is a signal indicating the second control mode and controls the opening degree of the indoor expansion valve 41 in the second control mode (step ST24). Specifically, the outdoor control unit 31 controls the opening degree of the indoor expansion valve 41 to be smaller than when the indoor expansion valve 41 is fully opened.

The outdoor control unit 31 controls the opening degree of the indoor expansion valve 41 in the first control mode or the second control mode, and then drives the outdoor fan 14, the indoor fan 43, and the compressor 11 (step ST25).

In the present modification, the opening degree of the indoor expansion valve 41 that is adjustable of the flow of the refrigerant in the refrigerant circuit 9 in the first control mode is larger than the opening degree of the indoor expansion valve 41 in the second control mode. As a result, in the first control mode, the flow rate of the refrigerant in the refrigerant circuit 9 can be easily increased as compared with the second control mode.

[Others]

In the above embodiment, the outdoor control unit 31 and the like function as the refrigerant recovery control device. Alternatively, a centralized controller that controls the outdoor unit 3 and the indoor unit 4 may function as the refrigerant recovery control device, and the centralized controller may instruct the outdoor control unit 31 about the control mode of the refrigerant recovery operation. A remote controller communicably connected to the outdoor control unit 31 via a network may remotely control the refrigerant recovery operation of the air conditioner 1. In this case, the air conditioner 1 and the control unit of the remote controller constitute a refrigerant recovery control system of the present invention.

The present invention can be applicable to a refrigeration apparatus other than the air conditioner 1. Furthermore, the present invention may be applied to a chiller unit or a cascade unit.

In the above embodiment, in the first control mode, the compressor 11 is controlled such that the first pressure becomes a value close to the protection lower limit value or the second pressure becomes a value close to the protection upper limit value. Alternatively, the compressor 11 may be controlled such that the first pressure becomes a value close to the protection lower limit value and the second pressure becomes a value close to the protection upper limit value.

The liquid-side shutoff valve 17 and the gas-side shutoff valve 18 may be configured to be manually opened and closed. In this case, the liquid-side shutoff valve 17 and the gas-side shutoff valve 18 only need to be manually closed during the refrigerant recovery operation.

In the above embodiment, the liquid-side shutoff valve 17 is closed during the refrigerant recovery operation, but the outdoor expansion valve 15 may be closed, and the refrigerant may be recovered between the outdoor expansion valve 15 and the gas-side shutoff valve 18.

The present disclosure should not be limited to the above exemplification, but is intended to include any modification recited in claims within meanings and a scope equivalent to those of the claims.

REFERENCE SIGNS LIST 1 air conditioner (refrigeration apparatus)
9 refrigerant circuit
11 compressor
31 outdoor control unit (control unit)
41 indoor expansion valve (valve)

The invention claimed is:

1. A refrigerant recovery control device comprising
   a control unit having a first control mode and a second control mode different from each other as control modes of a refrigerant recovery operation for recovering a refrigerant in a refrigerant circuit in a refrigeration apparatus with an outdoor expansion valve or a liquid-side shutoff valve of the refrigerant circuit being closed, wherein
   the refrigerant in the refrigerant circuit in the first control mode has a flow rate that is larger than a flow rate of the refrigerant in the refrigerant circuit in the second control mode.

2. The refrigerant recovery control device according to claim 1, wherein a rotational speed of a compressor that compresses and discharges the refrigerant in the refrigerant circuit in the first control mode is higher than a rotational speed of the compressor in the second control mode.

3. The refrigerant recovery control device according to claim 1, wherein an opening degree of a valve that adjusts the flow rate of the refrigerant in the refrigerant circuit in the first control mode is larger than an opening degree of the valve in the second control mode.

4. The refrigerant recovery control device according to claim 1, wherein
   the first control mode is used in a case where the refrigeration apparatus is discarded, and
   the second control mode is used in a case where the refrigeration apparatus is continuously used after the refrigerant is recovered.

5. The refrigerant recovery control device according to claim 2, wherein, in the first control mode, a pressure of the refrigerant sucked into the compressor reaches a predetermined protection lower limit value, or a pressure of the refrigerant discharged from the compressor reaches a predetermined protection upper limit value.

6. A refrigerant recovery control device comprising
a control unit having a first control mode and a second control mode different from each other as control modes of a refrigerant recovery operation for recovering a refrigerant in a refrigerant circuit in a refrigeration apparatus, wherein
the refrigerant in the refrigerant circuit in the first control mode has a flow rate that is larger than a flow rate of the refrigerant in the refrigerant circuit in the second control mode,
a rotational speed of a compressor that compresses and discharges the refrigerant in the refrigerant circuit in the first control mode is higher than a rotational speed of the compressor in the second control mode,
the compressor includes
a drooping lower limit value that is a lower limit value of a first pressure of the refrigerant sucked into the compressor and a drooping upper limit value that is an upper limit value of a second pressure of the refrigerant discharged from the compressor, during a normal operation of the refrigeration apparatus, and
a protection lower limit value that is an allowable lower limit value of the first pressure and a protection upper limit value that is an allowable upper limit value of the second pressure, for protection against damage to the compressor,
in the first control mode, the first pressure becomes a value of the protection lower limit value, or the second pressure becomes a value of the protection upper limit value, and in the second control mode, the first pressure is higher than or equal to the drooping lower limit value, and the second pressure is lower than or equal to the drooping upper limit value.

7. A refrigerant recovery control system comprising:
a refrigeration apparatus that performs a refrigerant recovery operation for recovering a refrigerant in a refrigerant circuit with an outdoor expansion valve or a liquid-side shutoff valve of the refrigerant circuit being closed; and
a control unit having a first control mode and a second control mode different from each other as control modes of the refrigerant recovery operation, wherein
the refrigerant in the refrigerant circuit in the first control mode has a flow rate that is larger than a flow rate of the refrigerant in the refrigerant circuit in the second control mode.

8. The refrigerant recovery control device according to claim 2, wherein an opening degree of a valve that adjusts the flow rate of the refrigerant in the refrigerant circuit in the first control mode is larger than an opening degree of the valve in the second control mode.

9. The refrigerant recovery control device according to claim 2, wherein
the first control mode is used in a case where the refrigeration apparatus is discarded, and
the second control mode is used in a case where the refrigeration apparatus is continuously used after the refrigerant is recovered.

10. The refrigerant recovery control device according to claim 3, wherein
the first control mode is used in a case where the refrigeration apparatus is discarded, and
the second control mode is used in a case where the refrigeration apparatus is continuously used after the refrigerant is recovered.

* * * * *